US009197711B1

(12) United States Patent (10) Patent No.: US 9,197,711 B1
Efstathopoulos et al. (45) Date of Patent: Nov. 24, 2015

(54) SYSTEMS AND METHODS FOR DETECTING THE PRESENCE OF WEB TRACKING

(71) Applicant: Symantec Corporation, Mountain View, CA (US)

(72) Inventors: Petros Efstathopoulos, Los Angeles, CA (US); Tai-Ching Li, Moreno Valley, CA (US)

(73) Assignee: Symantec Corporation, Mountain View, CA (US)

( * ) Notice: Subject to any disclaimer, the term of this patent is extended or adjusted under 35 U.S.C. 154(b) by 291 days.

(21) Appl. No.: 13/774,967

(22) Filed: Feb. 22, 2013

(51) Int. Cl.
*H04L 29/08* (2006.01)
*H04L 29/06* (2006.01)

(52) U.S. Cl.
CPC ............ *H04L 67/22* (2013.01); *H04L 63/10* (2013.01); *H04L 63/126* (2013.01); *H04L 67/02* (2013.01); *H04L 67/306* (2013.01)

(58) Field of Classification Search
CPC ....... H04L 67/02; H04L 67/20; H04L 63/145; H04L 63/1416; H04L 63/1458; H04L 63/0407; H04L 67/22; H04L 67/142; H04L 67/306; H04L 63/10; H04L 63/102; H04L 63/126; G06F 21/6263; G06F 21/44
See application file for complete search history.

(56) References Cited

U.S. PATENT DOCUMENTS

| 7,730,532 | B1* | 6/2010 | Yeo | 726/22 |
|---|---|---|---|---|
| 8,166,406 | B1* | 4/2012 | Goldfeder et al. | 715/745 |
| 8,312,543 | B1* | 11/2012 | Gardner | 726/23 |
| 8,370,475 | B1* | 2/2013 | Harvey et al. | 709/223 |
| 2008/0263627 | A1* | 10/2008 | Berteau et al. | 726/1 |
| 2010/0125668 | A1* | 5/2010 | Bocchieri et al. | 709/228 |
| 2011/0209216 | A1* | 8/2011 | Zohar et al. | 726/22 |
| 2011/0214163 | A1* | 9/2011 | Smith et al. | 726/4 |
| 2011/0270969 | A1* | 11/2011 | Noh et al. | 709/224 |
| 2013/0167195 | A1* | 6/2013 | Etchegoyen | 726/3 |
| 2013/0268357 | A1* | 10/2013 | Heath | 705/14.53 |

* cited by examiner

*Primary Examiner* — Ramy M Osman
(74) *Attorney, Agent, or Firm* — ALG Intellectual Property, LLC (57) ABSTRACT

A computer-implemented method for detecting the presence of web tracking may include identifying an Internet resource that may be retrieved from an initial domain and that may trigger a hypertext transfer protocol request directed to an additional domain that may be different from the initial domain, determining, based on a difference between the initial domain and the additional domain, that the hypertext transfer protocol request may include a third-party hypertext transfer protocol request, identifying a hypertext transfer protocol cookie that may be sent from the additional domain in response to the third-party hypertext transfer protocol request and determining, based on an expiration date of the hypertext transfer protocol cookie and the difference between the initial domain and the additional domain, that the hypertext transfer protocol cookie may include a third-party tracking cookie. Various other methods, systems, and computer-readable media are also disclosed.

20 Claims, 7 Drawing Sheets

SYSTEMS AND METHODS FOR DETECTING THE PRESENCE OF WEB TRACKING

BACKGROUND

As Internet usage grows, web privacy has become an increasingly important issue and a growing number of methods of web tracking pose a threat to this privacy. Spyware, viruses and malware have long been considered privacy threats, but they are far from the only methods of web tracking. One very common form of web tracking utilizes hypertext transfer protocol (HTTP) cookies to follow a user's activities across multiple domains and report that information to a server. Advertisers can use information from tracking cookies to profile users and target them specifically, as can social engineers and other malicious actors.

Standards such as Do Not Track attempt to address this problem by allowing users to opt out of tracking, but it may be difficult to tell if a website is honoring this convention. Traditional methods for detecting the presence of web tracking may require several round-trips between a client and a server and therefore may be slow and resource-intensive. These traditional methods also may suffer from high rates of false positives or false negatives. Accordingly, the instant disclosure identifies and addresses a need for additional and improved systems and methods for detecting the presence of web tracking.

SUMMARY

As will be described in greater detail below, the instant disclosure generally relates to systems and methods for detecting the presence of web tracking by determining that a request triggered by an Internet resource is be a third-party request and determining that a cookie sent by the request and/or response to the request is be a third-party tracking cookie.

In one example, a computer-implemented method for detecting the presence of web tracking may include (1) identifying an Internet resource that may be retrieved from an initial domain and that may trigger a hypertext transfer protocol request directed to an additional domain that may be different from the initial domain, (2) determining, based on a difference between the initial domain and the additional domain, that the hypertext transfer protocol request may include a third-party hypertext transfer protocol request, (3) identifying a hypertext transfer protocol cookie that may be sent from the additional domain in response to the third-party hypertext transfer protocol request and (4) determining, based on an expiration date of the hypertext transfer protocol cookie and the difference between the initial domain and the additional domain, that the hypertext transfer protocol cookie may include a third-party tracking cookie.

In one embodiment, the computer-implemented method may further include (1) identifying a second Internet resource that may be retrieved from a second initial domain and that may trigger a second hypertext transfer protocol request directed to a second additional domain that may be different from the second initial domain, (2) determining, based on a second difference between the second initial domain and the second additional domain, that the second hypertext transfer protocol request may include a second third-party hypertext transfer protocol request, (3) identifying a second hypertext transfer protocol cookie that may be sent by the second third-party hypertext transfer protocol request and (4) determining, based on the second difference between the second initial domain and the second additional domain, that the second hypertext transfer protocol cookie may include a second third-party tracking cookie.

In some examples, the computer-implemented method may include determining that the third-party hypertext transfer protocol request did not send a second hypertext transfer protocol cookie; wherein identifying the hypertext transfer protocol cookie that may be sent from the additional domain in response to the third-party hypertext transfer protocol request may be in response to determining that the third-party hypertext transfer protocol request did not send a second hypertext transfer protocol cookie.

In some examples, the computer-implemented method may include performing a security action based on determining that the hypertext transfer protocol cookie may be the third-party tracking cookie.

In one embodiment, the security action may include at least one of: (1) blocking the third-party tracking cookie, (2) alerting a user about the third-party tracking cookie, and/or (3) storing, in a security database, the additional domain of the third-party hypertext transfer protocol cookie and a characterization of the third-party hypertext transfer protocol cookie as the third-party tracking cookie and (4) blacklisting the additional domain of the third-party tracking cookie.

In one embodiment, determining, based on the additional domain, that the hypertext transfer protocol request may include a third-party hypertext transfer protocol request may include determining that there may be a difference between a request target of the hypertext transfer protocol request and a referrer of the hypertext transfer protocol request.

In some examples, identifying the Internet resource may include collecting hypertext transfer protocol session data.

In one embodiment the computer-implemented method may further include (1) sending a second hypertext transfer protocol request without a do-not-track header to a domain, (2) deleting at least one hypertext transfer protocol cookie sent by the second hypertext transfer protocol request, (3) sending a third hypertext transfer protocol request with the do-not-track header to the domain and (4) comparing a second hypertext transfer protocol response from the domain elicited by the second hypertext transfer protocol request with a third hypertext transfer protocol response from the domain elicited by the third hypertext transfer protocol request.

In one embodiment, the computer-implemented method may further include at least one of identifying a second hypertext transfer protocol cookie sent by the second hypertext transfer protocol response but not sent by the third hypertext transfer protocol response and/or identifying a second hypertext transfer protocol cookie sent by the third hypertext transfer protocol response but not sent by the second hypertext transfer protocol response.

In one embodiment, the computer-implemented method may further include (1) sending a second hypertext transfer protocol request without a do-not-track header to a domain, (2) maintaining at least one hypertext transfer protocol cookie sent by the second hypertext transfer protocol request, (3) sending a third hypertext transfer protocol request with the do-not-track header to the domain and (4) comparing a second hypertext transfer protocol response from the domain elicited by the second hypertext transfer protocol request with a third hypertext transfer protocol response from the domain elicited by the third hypertext transfer protocol request.

In one embodiment, the computer-implemented method may further include at least one of (1) identifying a second hypertext transfer protocol cookie sent by the third hypertext transfer protocol response but not sent by the second hypertext transfer protocol response, (2) identifying a second hypertext transfer protocol cookie sent by the second hypertext transfer protocol response and deleted by the third hypertext transfer protocol response and/or (3) identifying a second hypertext transfer protocol cookie sent by the second hypertext transfer protocol response and modified by the third hypertext transfer protocol response.

In one embodiment, a system for implementing the above-described method may include (1) a resource identification module programmed to identify an Internet resource that may be retrieved from an initial domain and that may trigger a hypertext transfer protocol request directed to an additional domain that may be different from the initial domain, (2) a request determination module programmed to determine, based on a difference between the initial domain and the additional domain, that the hypertext transfer protocol request may include a third-party hypertext transfer protocol request, (3) a cookie identification module programmed to identify a hypertext transfer protocol cookie that may be sent from the additional domain in response to the third-party hypertext transfer protocol request, (4) a cookie determination programmed to determine, based on an expiration date of the hypertext transfer protocol cookie and the difference between the initial domain and the additional domain, that the hypertext transfer protocol cookie may include a third-party tracking cookie and (5) at least one processor configured to execute the resource identification module, the request determination module, the cookie identification module and the cookie determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify an Internet resource that may be retrieved from an initial domain and that may trigger a hypertext transfer protocol request directed to an additional domain that may be different from the initial domain, (2) determine, based on a difference between the initial domain and the additional domain, that the hypertext transfer protocol request may include a third-party hypertext transfer protocol request, (3) identify a hypertext transfer protocol cookie that may be sent from the additional domain in response to the third-party hypertext transfer protocol request and (4) determine, based on an expiration date of the hypertext transfer protocol cookie and the difference between the initial domain and the additional domain, that the hypertext transfer protocol cookie may include a third-party tracking cookie.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting the presence of web tracking. As will be explained in greater detail below, detecting the presence of web tracking by examining the expiration date on third-party cookies allows for fast, lightweight identification of tracking cookies that can be performed entirely on the backend.

Figure 1:
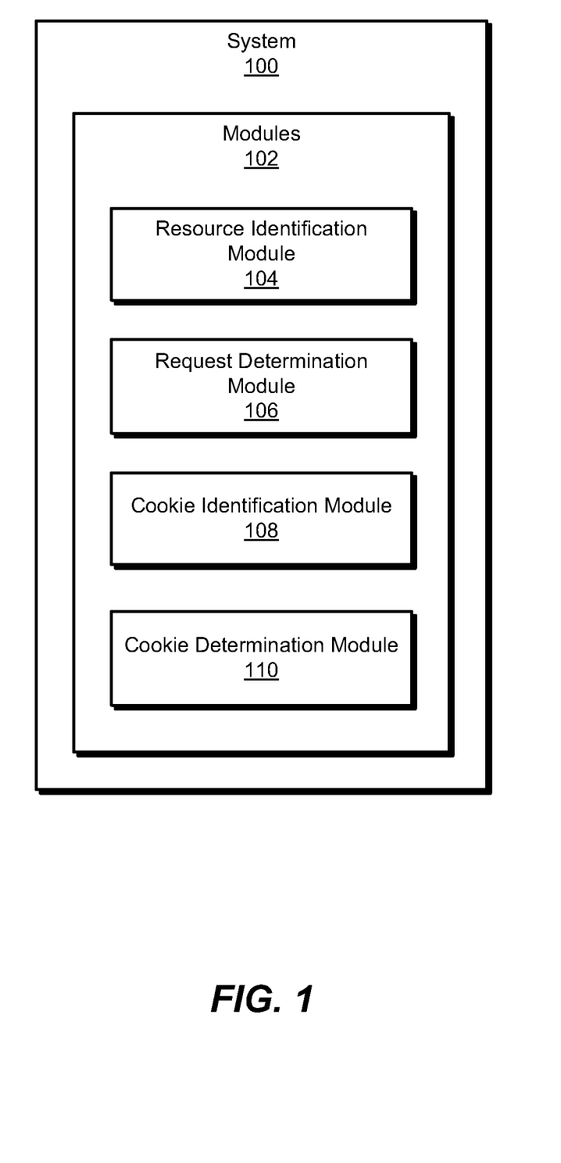
FIG. 1 is a block diagram of an exemplary system for detecting the presence of web tracking.
Figure 2:
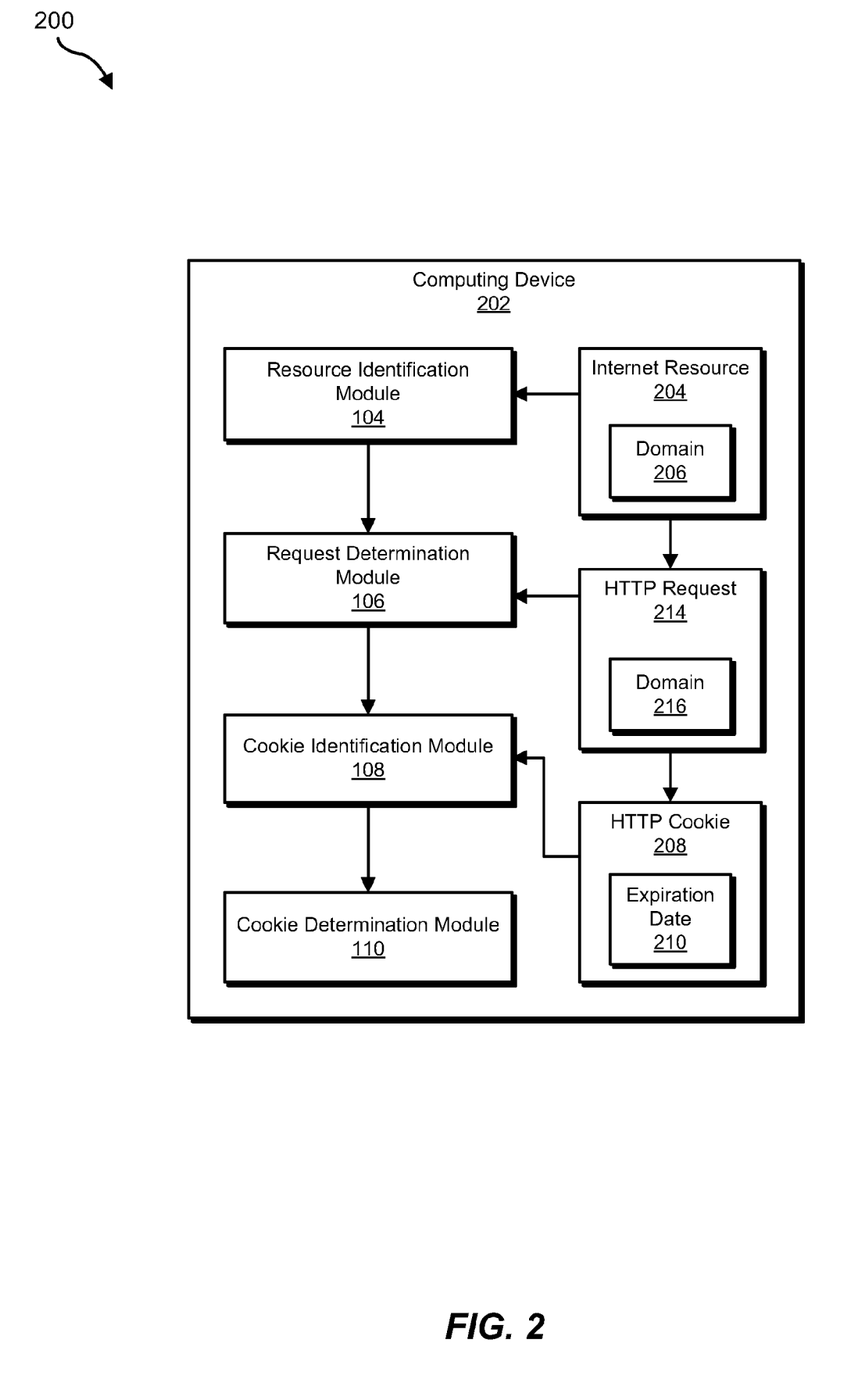
FIG. 2 is a block diagram of an exemplary system for detecting the presence of web tracking.
Figure 4:
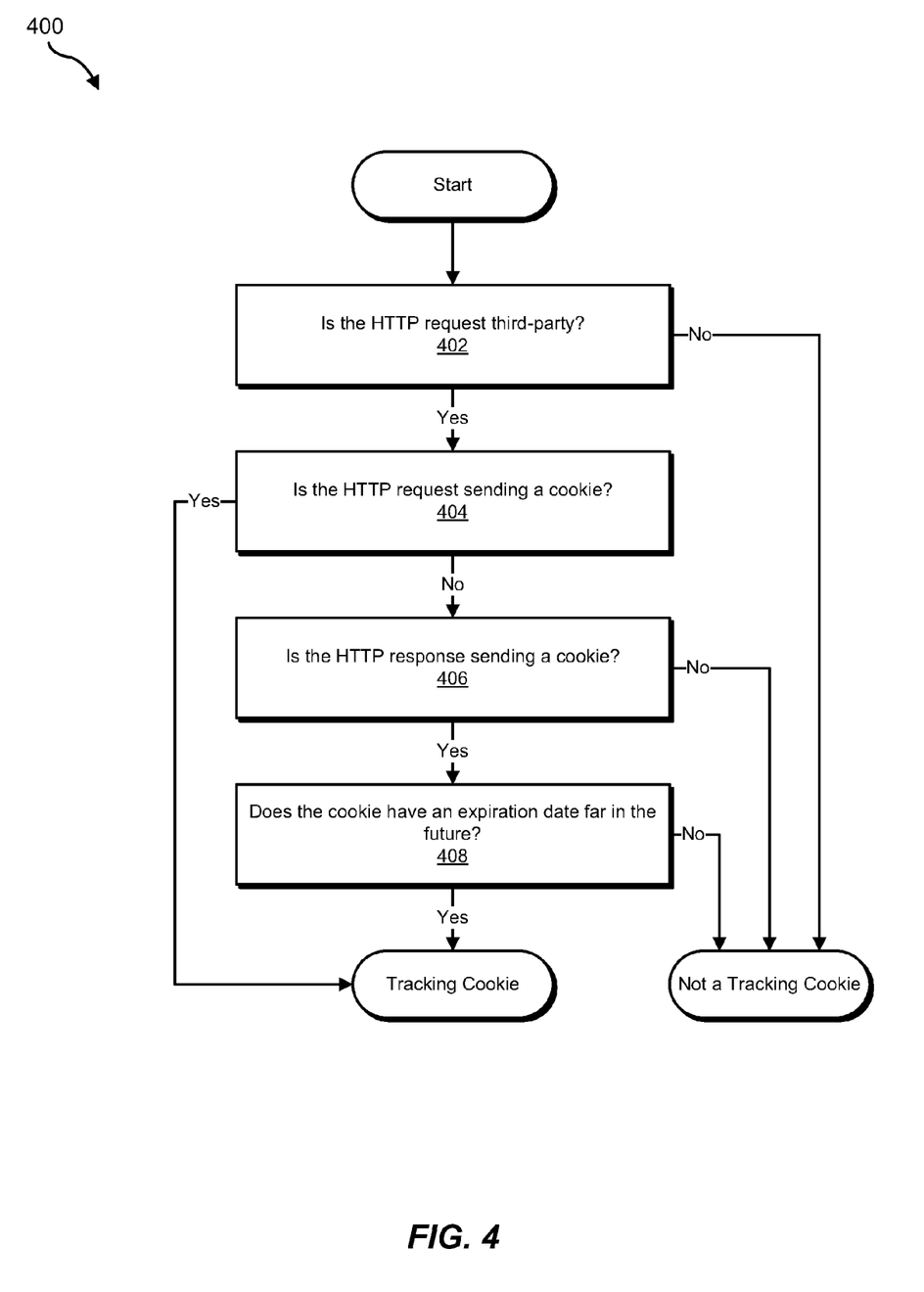
FIG. 4 is a flow diagram of an exemplary method for detecting the presence of web tracking.
Figure 5:
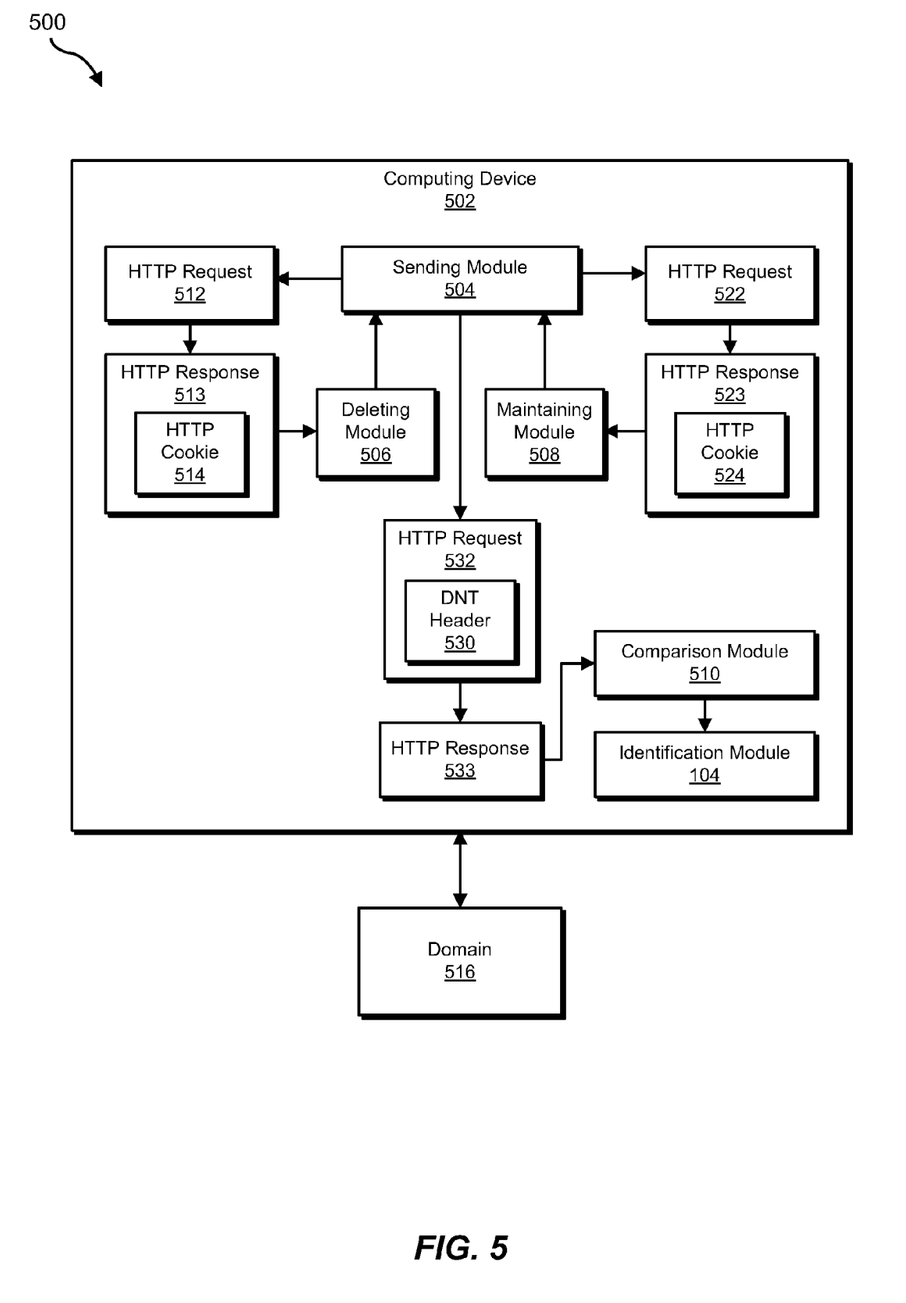
FIG. 5 is a block diagram of an exemplary system for detecting the presence of web tracking.

The following will provide, with reference to FIGS. 1-2 and 5, detailed descriptions of exemplary systems for detecting the presence of web tracking. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting the presence of web tracking. As illustrated in this figure, exemplary system 100 may include one or more modules 102 for performing one or more tasks. For example, and as will be explained in greater detail below, exemplary system 100 may include a resource identification module 104 programmed to identify an Internet resource that may be retrieved from an initial domain and that may trigger a hypertext transfer protocol request directed to an additional domain that may be different from the initial domain. Exemplary system 100 may also include a request determination module 106 programmed to determine, based on a difference between the initial domain and the additional domain, that the hypertext transfer protocol request may include a third-party hypertext transfer protocol request.

Exemplary system 100 may additionally include a cookie identification module 108 programmed to identify a hypertext transfer protocol cookie that may be sent from the additional domain in response to the third-party hypertext transfer protocol request. Exemplary system 100 may also include a cookie determination module 110 programmed to determine, based on an expiration date of the hypertext transfer protocol cookie and the difference between the initial domain and the additional domain, that the hypertext transfer protocol cookie may include a third-party tracking cookie. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. Computing device 202 may be programmed with one or more of modules 102.

In one embodiment, one or more of modules 102 from FIG. 1 may, when executed by at least one processor of computing device 202, facilitate computing device 202 in detecting the presence of web tracking. For example, and as will be described in greater detail below, one or more of modules 102 may cause computing device 202 to detecting the presence of web tracking. For example, and as will be described in greater detail below, resource identification module 104 may be programmed to identify an Internet resource 204 that may be retrieved from a domain 206 and that may trigger a HTTP request 214 directed to a domain 216 that may be different from domain 206. Request determination module 106 may be programmed to determine, based on a difference between domain 206 and domain 216, that HTTP request 214 may include a third-party HTTP request. Cookie identification module 108 may be programmed to identify a HTTP cookie 208 that may be sent from domain 216 in response to the third-party HTTP request. Cookie determination module 110 may be programmed to determine, based on an expiration date 210 of HTTP cookie 208 and the difference between domain 206 and domain 216, that HTTP cookie 208 may include a third-party tracking cookie.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Figure 3:
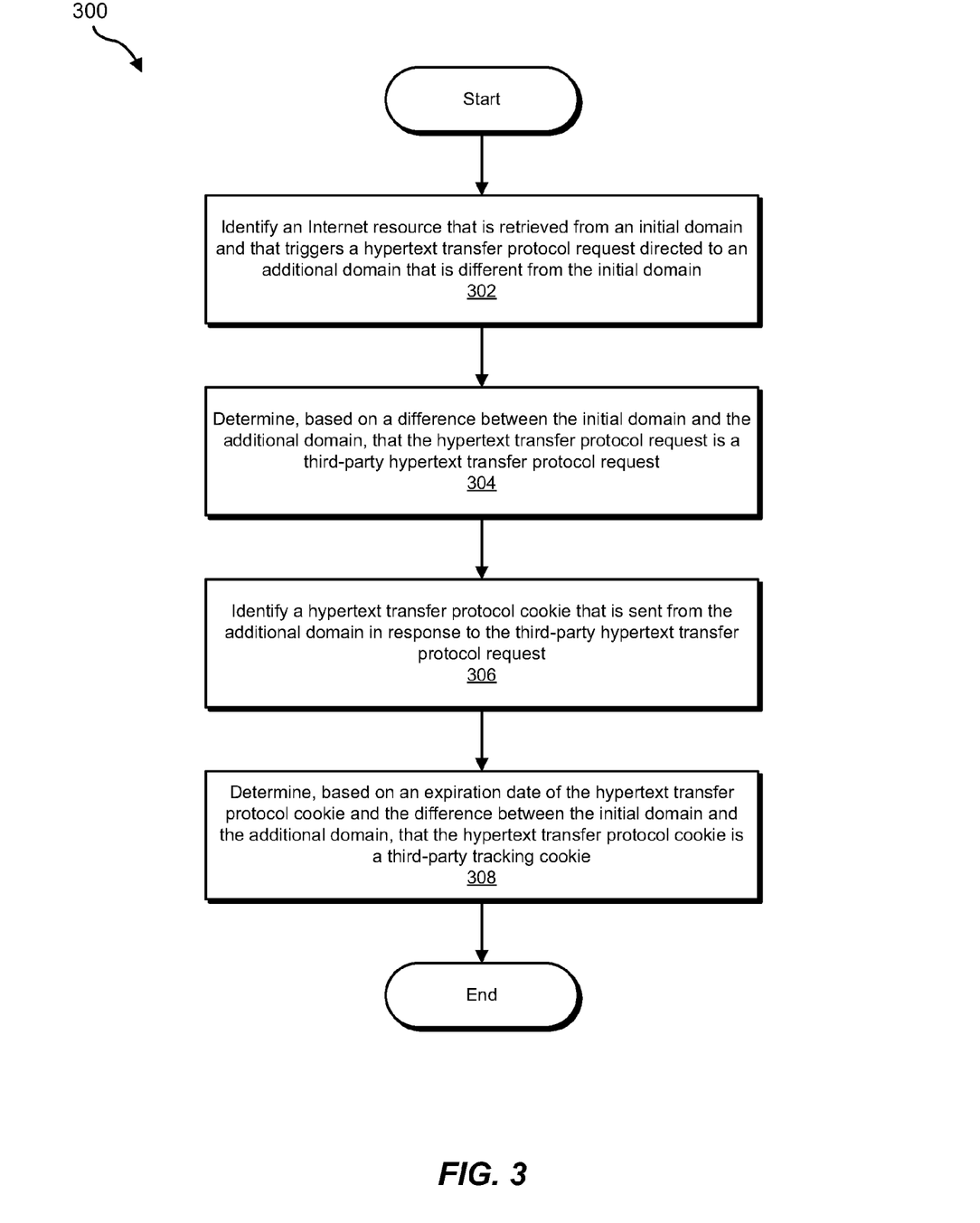
FIG. 3 is a flow diagram of an exemplary method for detecting the presence of web tracking.

FIG. 3 is a flow diagram of an exemplary computer-implemented method 300 for detecting the presence of web tracking. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify an Internet resource retrieved from an initial domain and that triggers a hypertext transfer protocol request directed to an additional domain that is different from the initial domain. For example, at step 302 resource identification module 104 may, as part of computing device 202 in FIG. 2, identify an Internet resource 204 that may be retrieved from a domain 206 and that may trigger an HTTP request 214 directed to a domain 216 that may be different from domain 206.

For example, a web browser may retrieve the website "http://example.com". The process of loading the home page of the website may trigger an HTTP request to "http://tracking.com", which may be a different domain from example.com. In this example, resource identification module 104 may (e.g., operating as a plug-in in the web browser) identify that domain of the HTTP request differs from the domain of the original website.

In one embodiment, a security server performing automated tests on large quantities of Internet resources may retrieve the website "http://example.com". The HTTP response from the example.com server to the security server may trigger multiple additional HTTP requests, including one to "http://tracking.com".

In some examples, the Internet resource may trigger a HTTP request because the Internet resource may include a website that includes external components such as advertisements, widgets and/or plug-ins. Some examples may include GOOGLE ADWORDS, FACEBOOK social plug-ins, and/or STATCOUNTER hit tracking code.

As used herein, the term "Internet resource" generally refers to any object or data which may be retrieved from the Internet. Examples may include but are not limited to websites, HTTP responses, images, text, files, and/or network traffic.

As used herein, the phrases "hypertext transfer protocol request" or "HTTP request" generally refer to any data sent over a network that may have characteristics similar to headers, request targets and/or cookies. Examples may include but are not limited to hypertext transfer protocol requests and/or responses, transmissions control protocol over Internet protocol (TCP/IP) data of any type, file transfer protocol uploads and/or downloads, and/or short message service transmissions.

As used herein, the term "domain" generally refers to any identifier of a resource on a network or to the resource itself. Some examples may include a uniform resource locator, the domain portion of a uniform resource locator, an Internet protocol address, a file system address, the name of a website, a server, and/or an identifier for a server.

In some embodiments, resource identification module 104 identifying the Internet resource may include collecting hypertext transfer protocol session data. Examples of HTTP session data may include HTTP requests and/or responses and/or HTTP cookies. For example, a tracking detection plug-in may collect all of the HTTP requests triggered by a particular HTTP response and all of the HTTP cookies sent by the HTTP response. Examples of products that may be used to collect HTTP session data include NORTON TOOLBAR, NORTON CLIENT, NORTON ANTIVIRUS, and/or a cloud service.

At step 304 one or more of the systems described herein may determine, based on a difference between the initial domain and the additional domain, that the hypertext transfer protocol request may include a third-party hypertext transfer protocol request. For example, at step 304 request determination module 106 may, as part of computing device 202 in FIG. 2, determine, based on a difference between domain 206 and domain 216, that HTTP request 214 may include a third-party HTTP request 214.

For example, a tracking detection plug-in on the web browser may determine that the request to "http://tracking- .com" may include a third-party request because "tracking-.com" is a different domain than "example.com".

In one embodiment, the security server may determine that the request to "http://tracking.com" may include a third-party request because "tracking.com" is a different domain than "example.com".

In one embodiment, request determination module 106 may determine, based on the additional domain, that the hypertext transfer protocol request may include a third-party hypertext transfer protocol request may include determining that there may be a difference between a request target of the hypertext transfer protocol request and a referrer of the hypertext transfer protocol request. For example, the HTTP request may have the request target "tracking.com" and the referrer "example.com".

In one embodiment, request determination module 106 may determine, based on the additional domain, that the hypertext transfer protocol request may include a third-party hypertext transfer protocol request may include comparing the domain of the HTTP request with the domain of the Internet resource. For example, the domain of the Internet resource may be "example.com" and the domain of the HTTP request may be "tracking.com".

At step 306 one or more of the systems described herein may identify a hypertext transfer protocol cookie that may be sent from the additional domain in response to the third-party hypertext transfer protocol request. For example, at step 306 cookie identification module 108 may, as part of computing device 202 in FIG. 2, identify a HTTP cookie 208 that may be sent from domain 216 in response to the third-party HTTP request 214.

For example, the tracking detection plug-in may examine the HTTP response to the HTTP request to "http://tracking-.com" and identify a cookie header in the HTTP response.

In one embodiment, a security server may examine the HTTP response to the HTTP request to "http://tracking.com" and identify a cookie header in the HTTP response.

As used herein, the phrase "hypertext transfer protocol cookie" generally refers to any persistent object or data sent by a server which may be stored on a computing device. Examples may include HTTP cookies, FLASH cookies, and/or HTML5 persistent state data.

In some examples, one or more of the systems described herein may also (1) identify a second Internet resource that may be retrieved from a second initial domain and that may trigger a second hypertext transfer protocol request directed to a second additional domain that may be different from the second initial domain, (2) determine, based on a second difference between the second initial domain and the second additional domain, that the second hypertext transfer protocol request may include a second third-party hypertext transfer protocol request, (3) identify a second hypertext transfer protocol cookie that may be sent by the second third-party hypertext transfer protocol request, and (4) determine, based on the second difference between the second initial domain and the second additional domain, that the second hypertext transfer protocol cookie may include a second third-party tracking cookie.

FIG. 4 is a flow diagram of an exemplary method 400 for detecting the presence of web tracking. For example, as illustrated in FIG. 4, systems described herein method may determine that the second HTTP request may be third-party. Because the second HTTP request may be third-party, systems described herein may determine that the second HTTP request may send a second HTTP cookie. Because the second HTTP request may send a second HTTP cookie, the second HTTP cookie may include a second third-party tracking cookie.

For example, a web browser may receive an HTTP response from "www.example.com", which may trigger a third-party HTTP request to "www.tracking.com". The third-party HTTP request to "www.tracking.com" may send a HTTP cookie. Because the HTTP cookie may be third-party and may be sent by a HTTP request, the HTTP cookie may include a third-party tracking cookie.

In some examples, request determination module 106 may also determine that the third-party hypertext transfer protocol request does not send a second hypertext transfer protocol cookie. In these examples, cookie identification module 108 may identify the hypertext transfer protocol cookie that is sent from the additional domain in response to the third-party hypertext transfer protocol request in response to request determination module 106 determining that the third-party hypertext transfer protocol request does not send a second hypertext transfer protocol cookie.

For example, as illustrated in FIG. 4, systems described herein may determine that the second HTTP request may be third-party. Because the second HTTP request may be third-party, systems described herein may determine that the second HTTP request did not send a second HTTP cookie. Because the second HTTP request did not send a HTTP cookie (and therefore, e.g., did not provide evidence of third-party tracking), systems described herein may determine whether the HTTP response to the second HTTP request sends a HTTP cookie.

For example, a web browser may receive an HTTP response from "www.example.com", which may trigger a third-party HTTP request to "www.tracking.com". The third-party HTTP request to "www.tracking.com" may not send a HTTP cookie. In this example, because the third-party HTTP request did not send a cookie, systems described herein may determine whether the HTTP response to the third-party HTTP request sends an HTTP cookie.

Returning to FIG. 3, at step 308 one or more of the systems described herein may determine, based on an expiration date of the hypertext transfer protocol cookie and the difference between the initial domain and the additional domain, that the hypertext transfer protocol cookie may include a third-party tracking cookie. For example, at step 308 cookie determination module 110 may, as part of computing device 202 in FIG. 2, determine, based on an expiration date 210 of HTTP cookie 208 and the difference between domain 206 and domain 216, that HTTP cookie 208 may include a third-party tracking cookie.

Determination module 110 may use the expiration date of the hypertext transfer protocol cookie to determine that the hypertext transfer protocol cookie includes a third-party tracking cookie in any suitable manner. For example, determination module 110 may determine that the expiration date occurs past a predetermined threshold of time (e.g., one year, two years, 20 years, 99 years, etc.). For example, the cookie header of the HTTP response from tracking.com may have an expiration date of Mar. 1, 2015, and the current date may be Jan. 22, 2013. The expiration date of the cookie may be farther than two years in the future, and so may be far more likely to correspond to a tracking cookie than a legitimate cookie. Due to the far future expiration date and the third-party nature of the cookie, determination module 110 may determine that the cookie is a tracking cookie. In this manner, determination module 110 may determine that the cookie is a tracking cookie without examining the contents of the cookie.

In some embodiments, a security module may perform a security action based on determining that the hypertext transfer protocol cookie may be the third-party tracking cookie. Examples of a security action may include blocking the third-party tracking cookie, alerting a user about the third-party tracking cookie, storing, in a security database, the additional domain of the third-party hypertext transfer protocol cookie and a characterization of the third-party hypertext transfer protocol cookie as the third-party tracking cookie, and/or blacklisting the additional domain of the third-party tracking cookie. In some embodiments, the security module may also include a whitelist of trusted domains which may send third-party cookies without triggering a security action.

FIG. 5 is a block diagram of an exemplary computing system 500 for detecting the presence of web tracking. FIG. 5 illustrates an exemplary method of determining how a domain may respond to a Do Not Track (DNT) header.

As used herein, the phrase "Do Not Track header" may refer to any information sent in a data transfer that indicates the sender's intent to not be subject to tracking methods of any kind. Examples may include but are not limited to the "Do Not Track" HTTP header standard supported by the W3C, and/or browser extensions that add similar headers to HTTP requests.

In one embodiment, one or more of the systems described herein may send a second hypertext transfer protocol request without a do-not-track header to a domain, delete at least one hypertext transfer protocol cookie sent by the second hypertext transfer protocol request, send a third hypertext transfer protocol request with the do-not-track header to the domain, and compare a second hypertext transfer protocol response from the domain elicited by the second hypertext transfer protocol request with a third hypertext transfer protocol response from the domain elicited by the third hypertext transfer protocol request.

For example, as illustrated in FIG. 5, a sending module 504 may send a HTTP request 512 to a domain 516, which may elicit a HTTP response 513 which may include a HTTP cookie 514. HTTP cookie 514 may be deleted by deleting module 506. Sending module 504 may then send a HTTP request 532 with DNT header 530 to domain 516, which may elicit a HTTP response 533. Comparison module 510 may compare HTTP response 513 and HTTP response 533. In some examples, identification module 106 may identify a cookie sent by HTTP response 513 but not sent by HTTP response 533, and/or a cookie sent by HTTP response 533 but not sent by HTTP response 513.

In one embodiment, one or more of the systems described herein may send a second hypertext transfer protocol request without a do-not-track header to a domain, maintain at least one hypertext transfer protocol cookie sent by the second hypertext transfer protocol request, send a third hypertext transfer protocol request with the do-not-track header to the domain, and compare a second hypertext transfer protocol response from the domain elicited by the second hypertext transfer protocol request with a third hypertext transfer protocol response from the domain elicited by the third hypertext transfer protocol request.

For example, as illustrated in FIG. 5, sending module 504 may send a HTTP request to example.com. Example.com may return an HTTP response which includes a cookie named "tracking." Deleting module 506 may delete the cookie named "tracking." Sending module 506 may then send another HTTP request to "example.com," this time with a DNT header. Example.com may return another HTTP response. Comparison module 510 may compare these two responses, and identification module 106 may identify the cookie named "tracking" in the first response but not in the second response. In this example, it may be that example.com responds to the presence of a DNT header by not sending a cookie named "tracking."

In one embodiment, sending module 504 may send a HTTP request 522 to a domain 516 which may elicit a HTTP response 523 which may include a HTTP cookie 524. HTTP cookie 524 may be maintained by maintaining module 508. Sending module 504 may then send HTTP request 532 with DNT header 530 to domain 516, which may elicit HTTP response 533. Comparison module 510 may compare HTTP 523 and HTTP response 533. In some examples, identification module 106 may identify a cookie sent by HTTP response 533 but not sent by HTTP response 523, a cookie sent by HTTP response 523 but deleted by HTTP response 533, and/or a cookie sent by HTTP response 523 and modified by HTTP response 533.

For example, sending module 504 may send a HTTP request to example.com. Example.com may return an HTTP response which includes a cookie named "tracking." Maintaining module 508 may maintain the cookie named "tracking." Sending module 506 may then send a second HTTP request to "example.com," this time with a DNT header. The second HTTP request may include the cookie named "tracking" because the cookie was maintained. Example.com may return another HTTP response. Comparison module 510 may compare these two responses, and identification module 106 may identify the cookie named "tracking" in the first response but not in the second response, and/or may identify a cookie named "donottrack" in the second response but not in the first response. In this example, it may be that example.com responds to the presence of a DNT header by deleting a cookie named "tracking," and/or by sending a cookie named "donottrack."

System 500 may also generate a report including information about how the domain responds to the DNT header. In some examples, the report may have a prefix that summarizes the cookie operations performed by the domain in response to the DNT header. For example, a prefix of "xxxx1" may indicate that at least one cookie may be sent in response to the DNT header in the first phase. A prefix of "xxx1x" may indicate that at least one cookie may not be sent in response to the DNT header in the first phase. A prefix of "xx1xx" may indicate that at least one cookie may be sent in response to the DNT header in the second phase. A prefix of "x1xxx" may indicate that at least one cookie may be modified in response to the DNT header in the second phase. A prefix of "1xxxx" may indicate that at least one cookie may be deleted in response to the DNT header in the second phase. As used herein, the phrase "first phase" may refer to the portion of the method that includes deleting at least one cookie, and "second phase" may refer to the portion of the method that includes maintaining at least one cookie. For example, a domain that does not send cookies when it receives a DNT header and deletes certain cookies if they exist may cause a report with the prefix "10010." The report may include the domain tested, the cookies added, modified and/or deleted, the date and time of the test, and/or the HTTP requests and responses involved in the test.

As explained above in connection with method 300 in FIG. 3, a computing device may identify an Internet resource that may trigger a third-party HTTP request. The third-party HTTP request may be caused by an embedded widget, advertisement and/or tracking service. The computing device may examine the third-party HTTP request in order to identify a third-party HTTP cookie.

If the third-party request sends a cookie then the computing device may be configured to determine that the cookie includes a third-party tracking cookie. If the third-party request does not send a cookie then the computing device may examine the HTTP response to the third-party request. If the HTTP response sends a cookie and the cookie has an expiration date far in the future than the cookie may include a third-party tracking cookie. If a third-party tracking cookie is identified then the computing device may take a security action such as alerting a user to the third-party tracking cookie, storing information about the cookie in a security database, and/or blocking the cookie.

The computing device may also examine the response of a domain to a Do Not Track (DNT) header. The computing device may send an HTTP request without a DNT header to the domain and examine the HTTP response returned by the domain for cookies. The computing device may then delete all cookies associated with the domain and send another HTTP request, this time with the DNT header, and examine the HTTP response for cookies. The computing device may compare the first and the second HTTP responses and any associated cookies to determine if there is a difference in how the domain responds on a first visit to HTTP requests with and without the DNT header.

The computing device may also send an additional HTTP request to the domain without the DNT header, followed by another HTTP request with the DNT header and with the cookies sent in response to the previous HTTP request. The computing device may compare the previous two HTTP responses and any associated cookies to determine how the domain responds to a HTTP request with the DNT header and previously sent cookies. The computing device may then alert a user to this information, generate a report, and/or store a report in a security database.

Figure 6:
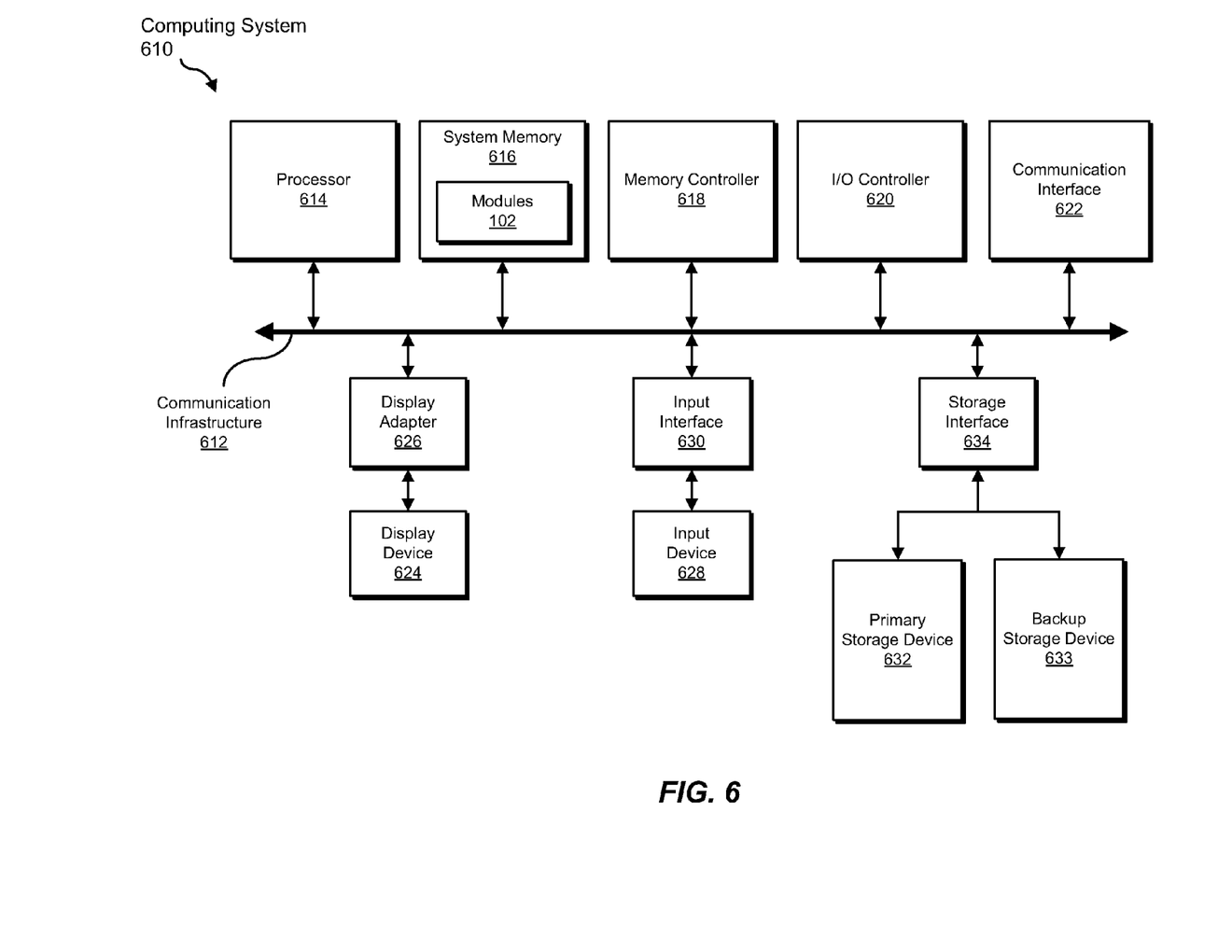
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, determining, performing, blocking, alerting, storing, blacklisting, sending, deleting, comparing, and maintaining steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
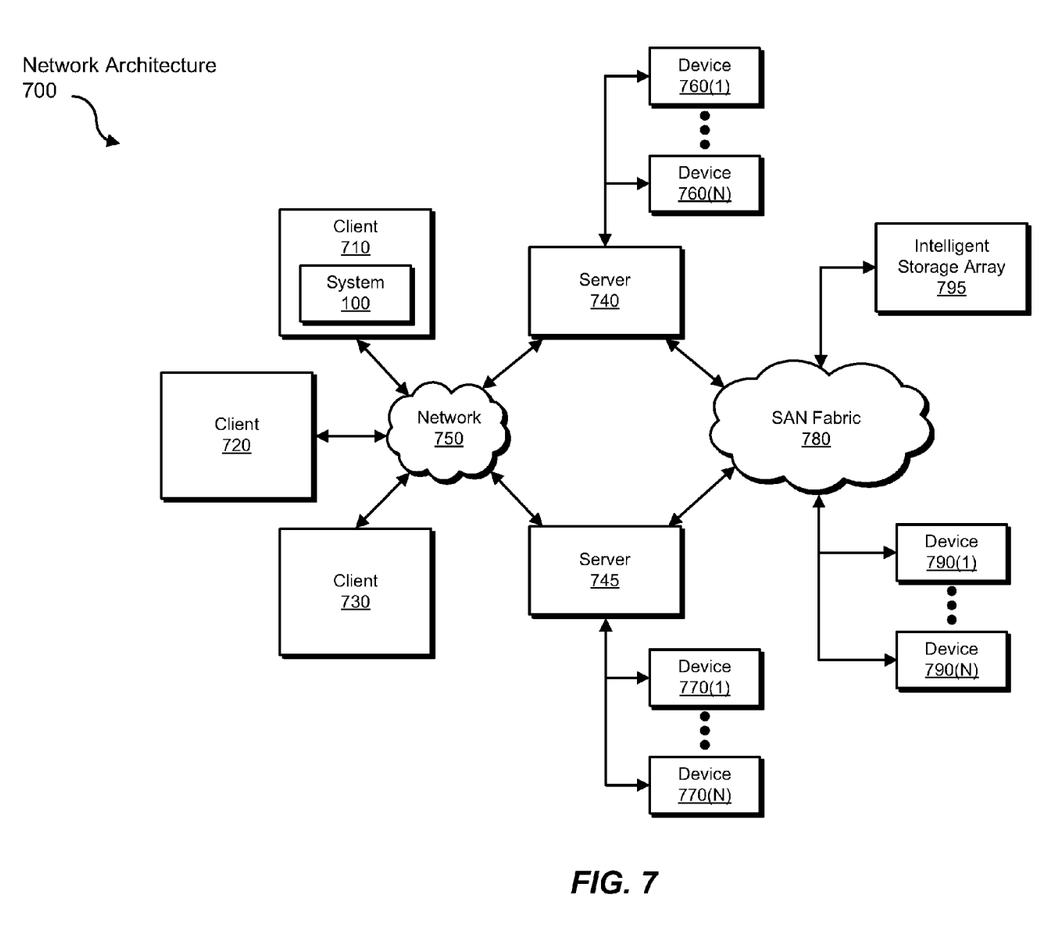
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, determining, performing, blocking, alerting, storing, blacklisting, sending, deleting, comparing, and maintaining steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting the presence of web tracking.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive session data to be transformed, transform the session data, output a result of the transformation to modules, use the result of the transformation to detect the presence of web tracking, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting the presence of web tracking, at least a portion of the method being performed by a computing device comprising at least one hardware processor, the method comprising:
    identifying, at the computing device, an Internet resource that is retrieved from an initial domain and that triggers a hypertext transfer protocol request directed to an additional domain that is different from the initial domain;
    determining, based on a difference between the initial domain and the additional domain, that the hypertext transfer protocol request comprises a third-party hypertext transfer protocol request;
    identifying a hypertext transfer protocol cookie that is sent from the additional domain in response to the third-party hypertext transfer protocol request;
    without examining contents of the hypertext transfer protocol cookie, determining, based on an expiration date of the hypertext transfer protocol cookie occurring after a predetermined threshold of time and the difference between the initial domain and the additional domain, that the hypertext transfer protocol cookie comprises a third-party tracking cookie.

2. The computer-implemented method of claim 1, further comprising:
    identifying a second Internet resource that is retrieved from a second initial domain and that triggers a second hypertext transfer protocol request directed to a second additional domain that is different from the second initial domain;
    determining, based on a second difference between the second initial domain and the second additional domain, that the second hypertext transfer protocol request comprises a second third-party hypertext transfer protocol request;
    identifying a second hypertext transfer protocol cookie that is sent by the second third-party hypertext transfer protocol request;
    determining, based on the second difference between the second initial domain and the second additional domain, that the second hypertext transfer protocol cookie comprises a second third-party tracking cookie.

3. The computer-implemented method of claim 1, further comprising determining that the third-party hypertext transfer protocol request does not send a second hypertext transfer protocol cookie;
    wherein identifying the hypertext transfer protocol cookie that is sent from the additional domain in response to the third-party hypertext transfer protocol request is in response to determining that the third-party hypertext transfer protocol request does not send the second hypertext transfer protocol cookie.

4. The computer-implemented method of claim 1, further comprising performing a security action based on determining that the hypertext transfer protocol cookie comprises the third-party tracking cookie.

5. The computer-implemented method of claim 4, wherein the security action comprises at least one of:
    blocking the third-party tracking cookie;
    alerting a user about the third-party tracking cookie;
    storing, in a security database, the additional domain of the hypertext transfer protocol cookie and a characterization of the hypertext transfer protocol cookie as the third-party tracking cookie;
    blacklisting the additional domain of the third-party tracking cookie.

6. The computer-implemented method of claim 1, wherein determining, based on the additional domain, that the hypertext transfer protocol request comprises a third-party hypertext transfer protocol request comprises determining that there is a difference between a request target of the hypertext transfer protocol request and a referrer of the hypertext transfer protocol request.

7. The computer-implemented method of claim 1, wherein identifying the Internet resource comprises collecting hypertext transfer protocol session data.

8. The computer-implemented method of claim 1, further comprising:
    sending a second hypertext transfer protocol request without a do-not-track header to a domain;
    deleting at least one hypertext transfer protocol cookie sent by the second hypertext transfer protocol request;
    sending a third hypertext transfer protocol request with the do-not-track header to the domain;
    comparing a second hypertext transfer protocol response from the domain elicited by the second hypertext transfer protocol request with a third hypertext transfer protocol response from the domain elicited by the third hypertext transfer protocol request.

9. The computer-implemented method of claim 8, further comprising at least one of:
    identifying a second hypertext transfer protocol cookie sent by the second hypertext transfer protocol response but not sent by the third hypertext transfer protocol response;
    identifying the second hypertext transfer protocol cookie sent by the third hypertext transfer protocol response but not sent by the second hypertext transfer protocol response.

10. The computer-implemented method of claim 1, further comprising:
    sending a second hypertext transfer protocol request without a do-not-track header to a domain;
    maintaining at least one hypertext transfer protocol cookie sent by the second hypertext transfer protocol request;
    sending a third hypertext transfer protocol request with the do-not-track header to the domain;
    comparing a second hypertext transfer protocol response from the domain elicited by the second hypertext transfer protocol request with a third hypertext transfer protocol response from the domain elicited by the third hypertext transfer protocol request.

11. The computer-implemented method of claim 10, further comprising at least one of:

identifying a second hypertext transfer protocol cookie sent by the third hypertext transfer protocol response but not sent by the second hypertext transfer protocol response;

identifying the second hypertext transfer protocol cookie sent by the second hypertext transfer protocol response and deleted by the third hypertext transfer protocol response;

identifying the second hypertext transfer protocol cookie sent by the second hypertext transfer protocol response and modified by the third hypertext transfer protocol response.

12. A system for detecting the presence of web tracking: the system comprising:
   a resource identification module programmed to identify an Internet resource that is retrieved from an initial domain and that triggers a hypertext transfer protocol request directed to an additional domain that is different from the initial domain;
   a request determination module programmed to determine, based on a difference between the initial domain and the additional domain, that the hypertext transfer protocol request comprises a third-party hypertext transfer protocol request;
   a cookie identification module programmed to identify a hypertext transfer protocol cookie that is sent from the additional domain in response to the third-party hypertext transfer protocol request;
   a cookie determination module programmed to, without examining contents of the hypertext transfer protocol cookie, determine, based on an expiration date of the hypertext transfer protocol cookie occurring after a predetermined threshold of time and the difference between the initial domain and the additional domain, that the hypertext transfer protocol cookie comprises a third-party tracking cookie;
   at least one hardware processor configured to execute the resource identification module, the request determination module, the cookie identification module, and the cookie determination module.

13. The system of claim 12, further comprising:
   the resource identification module is programmed to identify a second Internet resource that is retrieved from a second initial domain and that triggers a second hypertext transfer protocol request directed to a second additional domain that is different from the second initial domain;
   the request determination module is programmed to determine, based on a second difference between the second initial domain and the second additional domain, that the second hypertext transfer protocol request comprises a second third-party hypertext transfer protocol request;
   the cookie identification module is programmed to identify a second hypertext transfer protocol cookie that is sent by the second third-party hypertext transfer protocol request;
   the cookie determination module is programmed to determine, based on the second difference between the second initial domain and the second additional domain, that the second hypertext transfer protocol cookie comprises a second third-party tracking cookie.

14. The system of claim 12, further comprising:
   the request determination module is programmed to determine that the third-party hypertext transfer protocol request does not send a second hypertext transfer protocol cookie;
   wherein the cookie identification module is programmed to identify the hypertext transfer protocol cookie that is sent from the additional domain in response to the third-party hypertext transfer protocol request in response to the request determination module determining that the third-party hypertext transfer protocol request does not send the second hypertext transfer protocol cookie.

15. The system of claim 12, further comprising a security module programmed to perform a security action based on determining that the hypertext transfer protocol cookie comprises the third-party tracking cookie.

16. The system of claim 15, wherein the security module is programmed to perform at least one of:
   blocking the third-party tracking cookie;
   alerting a user about the third-party tracking cookie;
   storing, in a security database, the additional domain of the hypertext transfer protocol cookie and a characterization of the hypertext transfer protocol cookie as the third-party tracking cookie;
   blacklisting the additional domain of the third-party tracking cookie.

17. The system of claim 12, wherein the request determination module is programmed to determine, based on the additional domain, that the hypertext transfer protocol request comprises a third-party hypertext transfer protocol request by determining that there is a difference between a request target of the hypertext transfer protocol request and a referrer of the hypertext transfer protocol request.

18. The system of claim 12, wherein the resource identification module is programmed to identify the Internet resource by collecting hypertext transfer protocol session data.

19. The system of claim 12, further comprising:
   a sending module programmed to send a second hypertext transfer protocol request without a do-not-track header to a domain;
   a deleting module programmed to delete at least one hypertext transfer protocol cookie sent by the second hypertext transfer protocol request;
   the sending module is programmed to send a third hypertext transfer protocol request with the do-not-track header to the domain;
   a comparing module programmed to compare a second hypertext transfer protocol response from the domain elicited by the second hypertext transfer protocol request with a third hypertext transfer protocol response from the domain elicited by the third hypertext transfer protocol request.

20. A non-transitory computer-readable-storage medium comprising one or more computer-readable instructions that, when executed by at least one processor of a computing device, cause the computing device to:
   identify an Internet resource that is retrieved from an initial domain and that triggers a hypertext transfer protocol request directed to an additional domain that is different from the initial domain;
   determine, based on a difference between the initial domain and the additional domain, that the hypertext transfer protocol request comprises a third-party hypertext transfer protocol request;
   identify a hypertext transfer protocol cookie that is sent from the additional domain in response to the third-party hypertext transfer protocol request;
   without examining contents of the hypertext transfer protocol cookie, determine, based on an expiration date of the hypertext transfer protocol cookie occurring after a predetermined threshold of time and the difference between the initial domain and the additional domain, that the hypertext transfer protocol cookie comprises a third-party tracking cookie.

\* \* \* \* \*